US012636938B2

(12) United States Patent
Kim et al.

(10) Patent No.: US 12,636,938 B2
(45) Date of Patent: May 26, 2026

(54) VEHICLE HEAT PUMP SYSTEM AND CONTROL METHOD THEREFOR

(71) Applicant: Hanon Systems, Daejeon (KR)

(72) Inventors: Hak Kyu Kim, Daejeon (KR); Bok Sun Kang, Daejeon (KR); Tae Wan Kim, Daejeon (KR); Jae Min Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 279 days.

(21) Appl. No.: 18/284,881

(22) PCT Filed: Apr. 25, 2022

(86) PCT No.: PCT/KR2022/005845
§ 371 (c)(1),
(2) Date: Apr. 29, 2024

(87) PCT Pub. No.: WO2022/231229
PCT Pub. Date: Nov. 3, 2022

(65) Prior Publication Data
US 2024/0262166 A1 Aug. 8, 2024

(30) Foreign Application Priority Data

Apr. 27, 2021 (KR) ........................ 10-2021-0054510
Apr. 21, 2022 (KR) ........................ 10-2022-0049496

(51) Int. Cl.
B60H 1/32 (2006.01)
B60H 1/00 (2006.01)

(52) U.S. Cl.
CPC ..... B60H 1/00914 (2013.01); B60H 1/00278 (2013.01); B60H 1/3207 (2013.01)

(58) Field of Classification Search
CPC ...... B60H 1/00921; B60H 2001/00928; B60H 1/00278; B60H 1/00385; B60H 1/143; B60H 1/00914; B60H 1/3207
See application file for complete search history.

(56) References Cited

U.S. PATENT DOCUMENTS 9,250,005 B2 * 2/2016 Oomura ................. B60H 1/321
10,118,458 B2 * 11/2018 Kim ......................... B60K 1/04
(Continued)

FOREIGN PATENT DOCUMENTS

JP H08132859 A 5/1996
JP 2004177064 A 6/2004
(Continued)

OTHER PUBLICATIONS

International Search Report issued in PCT/KR2022/005845 on Aug. 11, 2022.

*Primary Examiner* — Nelson J Nieves
(74) *Attorney, Agent, or Firm* — NORTON ROSE FULBRIGHT US LLP

(57) ABSTRACT

Disclosed in the present invention is a vehicle heat pump system capable of improving dehumidification performance by increasing the flow of a refrigerant toward an evaporator during heating and dehumidifying modes. The vehicle heat pump system comprises: a bypass line which branches off between a first expansion valve and an outdoor heat exchanger and bypasses through the outdoor heat exchanger and the evaporator; a first refrigerant flow control valve for adjusting the opening degree between the bypass line and a refrigerant line toward the outdoor heat exchanger; a dehumidification line branching off between the first expansion valve and the first refrigerant flow control valve to supply the refrigerant to the evaporator; and a control unit for controlling the amount of refrigerant supplied to the dehu- (Continued)

midification line according to outdoor air temperature or compressor RPM.

16 Claims, 8 Drawing Sheets

(56)                    References Cited

U.S. PATENT DOCUMENTS

| | | | | |
|---|---|---|---|---|
| 10,183,544 | B2 * | 1/2019 | Kim | F25B 25/005 |
| 10,661,631 | B2 * | 5/2020 | Kawano | B60H 1/22 |
| 10,717,337 | B2 * | 7/2020 | Kim | B60L 58/24 |
| 10,974,566 | B2 * | 4/2021 | Kim | B60H 1/00921 |
| 11,034,207 | B2 * | 6/2021 | Choi | B60H 1/00007 |
| 11,155,138 | B2 * | 10/2021 | Kim | B60H 1/00428 |
| 11,458,812 | B2 * | 10/2022 | Jeong | B60H 1/00921 |
| 11,571,948 | B2 * | 2/2023 | Kim | B60H 1/32284 |
| 11,634,004 | B2 * | 4/2023 | Kim | B60H 1/2221 |
| | | | | 62/259.2 |
| 11,865,899 | B2 * | 1/2024 | Ishizeki | B60H 1/00785 |
| 2010/0326127 | A1 * | 12/2010 | Oomura | B60H 1/3208 |
| | | | | 62/498 |

| | | | | |
|---|---|---|---|---|
| 2015/0210141 | A1 | 7/2015 | Ragazzi | |
| 2015/0217625 | A1 * | 8/2015 | Kang | F25B 30/06 |
| | | | | 62/160 |
| 2015/0273981 | A1 * | 10/2015 | Kang | F25B 6/04 |
| | | | | 62/419 |
| 2016/0016459 | A1 * | 1/2016 | Hamamoto | B60H 1/00007 |
| | | | | 62/160 |
| 2017/0361677 | A1 * | 12/2017 | Kim | H01M 10/663 |
| 2018/0117986 | A1 * | 5/2018 | Kim | B60H 1/00278 |
| 2020/0180391 | A1 * | 6/2020 | Kim | B60H 1/00278 |
| 2020/0338950 | A1 * | 10/2020 | Kim | B60H 1/00921 |
| 2020/0369108 | A1 * | 11/2020 | Kim | B60H 1/32284 |
| 2021/0252942 | A1 * | 8/2021 | Jeong | B60H 1/3213 |
| 2021/0309070 | A1 * | 10/2021 | Ishizeki | B60H 1/3205 |
| 2022/0363110 | A1 * | 11/2022 | Ishizeki | B60H 1/00021 |
| 2025/0135843 | A1 * | 5/2025 | Lee | B60H 1/32 |

FOREIGN PATENT DOCUMENTS

| | | | | |
|---|---|---|---|---|
| JP | 2021138269 A | * | 9/2021 | B60L 1/08 |
| KR | 100388559 B1 | | 6/2003 | |
| KR | 20150093590 A | | 8/2015 | |

* cited by examiner

[FIG. 1]

(Flow rate)

(Position)

S

VEHICLE HEAT PUMP SYSTEM AND CONTROL METHOD THEREFOR

CROSS REFERENCE TO RELATED APPLICATIONS

This patent application is a national phase under 35 U.S.C. § 371 of International Patent Application No. PCT/KR2022/005845 filed Apr. 25, 2022, which claims the benefit of priority from Korean Patent Application Nos. 10-2021-0054510 filed Apr. 27, 2021, and 10-2022-0049496 filed Apr. 21, 2022, each of which is hereby incorporated herein by reference in its entirety for all purposes.

TECHNICAL FIELD

The present invention relates to a vehicle heat pump system and a control method therefor, and more specifically, to a vehicle heat pump system, which, in a heating mode, supplies some of refrigerant to an evaporator to dehumidify the interior of a vehicle, and a control method of the heat pump system.

BACKGROUND ART

In general, an air conditioner for a vehicle includes a cooling system for cooling the interior of the vehicle, and a heating system for heating the interior of the vehicle. The cooling system, at an indoor heat exchanger side of a refrigerant cycle, converts the air passing the outside of an indoor heat exchanger into cold air by exchanging heat between the air and refrigerant flowing inside an evaporator. Moreover, the heating system, at a heater core side of a cooling water cycle, converts the air passing the outside of the heater core into warm air by exchanging heat between the air and cooling water flowing inside the heater core.

In the meantime, differently from the air conditioner for the vehicle, a heat pump system which is capable of selectively carrying out cooling and heating by changing a flow direction of refrigerant using one refrigerant cycle is disclosed. The heat pump system includes, for instance, two heat exchangers, namely, an indoor heat exchanger mounted inside an air conditioning case to exchange heat with air blown to the interior of the vehicle and an outdoor heat exchanger mounted outside the air conditioning case to exchange heat, and a direction-changing valve for changing a flow direction of refrigerant. The indoor heat exchanger serves as a heat exchanger for cooling when the heat pump system is operated in a cooling mode according to the flow direction of refrigerant by the direction-changing valve and also serves as a heat exchanger for heating when the heat pump system is operated in a heating mode.

Referring to FIG. 1, a conventional vehicle heat pump system comprises a compressor 30, an indoor heat exchanger 32, a first expansion valve 34, an outdoor heat exchanger 48, and an evaporator 60.

The compressor 30 sucks and compresses refrigerant, and then, discharges the refrigerant in a high-temperature and high-pressure gaseous state. The indoor heat exchanger 32 heat-exchanges the refrigerant discharged from the compressor 30 with the air passing through the compressor 30 to heat the air. The first expansion valve 34 expands the refrigerant which has passed through the indoor heat exchanger 32, and the outdoor heat exchanger 48 heat-exchanges the refrigerant which has passed through the first expansion valve 34 with the outdoor air. The evaporator 60 heat-exchanges the refrigerant with the air passing through the evaporator to cool the air.

The evaporator 60 and the indoor heat exchanger 32 are sequentially installed in an air flow direction inside an air conditioning case 10. Between the evaporator 60 and the indoor heat exchanger 32, a temperature door 12 is provided to control an air flow rate between a warm air passage and a cold air passage, thereby adjusting the air temperature. On one side of the air conditioning case 10, a blower 20 is provided to blow indoor air or outdoor air into an air passage of the air conditioning case 10.

Between the evaporator 60 and the compressor 30, an accumulator 62 is additionally provided to separate the refrigerant, which flows into the compressor 30, into gas and liquid phases. Furthermore, between the outdoor heat exchanger 48 and the evaporator 60, an internal heat exchanger 50 which heat-exchanges the refrigerant supplied to the evaporator 60 with the refrigerant returning to the compressor 30 can be additionally provided. Meanwhile, the refrigerant passing through the indoor heat exchanger 32 selectively flows to the first expansion valve 34 by a first bypass valve 36 installed in parallel to the first expansion valve 34.

In addition, upstream of the evaporator 60, a second expansion valve 56 which selectively expands the refrigerant supplied to the evaporator 60 is provided. Between the outdoor heat exchanger 48 and the second expansion valve 56, a second bypass valve 58 which is installed in parallel to the second expansion valve 56 and selectively connects an outlet of the outdoor heat exchanger 48 and an inlet of the accumulator 62 can be provided.

In an air conditioning mode (cooling mode), the first bypass valve 36 and the second expansion valve 56 are opened, and the first expansion valve 34 and the second bypass valve 58 are closed. The temperature door 12 opens the cold air passage. The refrigerant discharged from the compressor 30 sequentially passes through the indoor heat exchanger 32, the first bypass valve 36, the outdoor heat exchanger 48, the second expansion valve 56, the evaporator 60, and the accumulator 62, and then, returns to the compressor 30.

In a heat pump mode (heating mode), the first bypass valve 36 and the second expansion valve 56 are closed, and the first expansion valve 34 and the second bypass valve 58 are opened. Additionally, the temperature door 12 opens the warm air passage. The refrigerant discharged from the compressor 30 sequentially passes through the indoor heat exchanger 32, the first expansion valve 34, the outdoor heat exchanger 48, the second bypass valve 58, and the accumulator 62, and then, returns to the compressor 30. In this case, the indoor heat exchanger 32 acts as a heater, and the outdoor heat exchanger 48 acts as an evaporator.

On the other hand, during dehumidification in the heat pump mode, the refrigerant is discharged from the compressor 30, passes through the indoor heat exchanger 32. Thereafter, a portion of the refrigerant passing through the first expansion valve 34 sequentially passes through the outdoor heat exchanger 48, the second bypass valve 58, and the accumulator 62, and then, returns to the compressor 30. Additionally, another portion of the refrigerant passing through the first expansion valve 34 flows to the evaporator 60 to dehumidify the interior of the vehicle.

In the heat pump and dehumidification mode, since a dehumidification line acts as a system resistance such that a flow amount of refrigerant of low-temperature and low-pressure is not smoothly supplied toward the evaporator as many as required for dehumidification, the conventional vehicle heat pump system is deteriorated in dehumidification performance. Additionally, since excessive refrigerant is supplied to the dehumidification line, the conventional vehicle heat pump system is relatively deteriorated in heating performance and causes frost formation in the evaporator.

DISCLOSURE

Technical Problem

Accordingly, the present invention has been made in view of the above-mentioned problems occurring in the related art, and it is an object of the present invention to provide a vehicle heat pump system, which increases a refrigerant amount toward an evaporator in a heating and dehumidification mode, thereby enhancing dehumidification performance, and a control method of the vehicle heat pump system.

It is another object of the present invention to provide a vehicle heat pump system and a control method therefor, which controls refrigerant not to flow excessively toward the evaporator in the heating and dehumidification mode, thereby preventing deterioration of heating performance.

Technical Solution

To accomplish the above-mentioned objects, according to the present invention, there is provided a vehicle heat pump system, which includes: a compressor and discharging refrigerant; an indoor heat exchanger installed within an air conditioning case and exchanging heat between air and the refrigerant discharged from the compressor to radiate heat; a first expansion valve selectively expanding the refrigerant that has passed through the indoor heat exchanger; an outdoor heat exchanger exchanging heat between the outdoor air and the refrigerant that has passed through the first expansion valve; and an evaporator installed within the air conditioning case and evaporating the refrigerant that has passed through the outdoor heat exchanger by exchanging heat with the air, the system including: a bypass line which branches between the first expansion valve and the outdoor heat exchanger, and bypasses the outdoor heat exchanger and the evaporator; a first refrigerant flow control valve which adjusts the opening degree between the bypass line and a refrigerant line directing the outdoor heat exchanger; a dehumidification line which branches between the first expansion valve and the first refrigerant flow control valve and supplies the refrigerant to the evaporator; and a control unit which controls a refrigerant amount supplied to the dehumidification line depending on the outdoor air temperature or a compressor RPM.

The first refrigerant flow control valve is a three-way valve capable of adjusting the refrigerant amount toward the bypass line and the outdoor heat exchanger, and the control unit controls the refrigerant amount supplied to the dehumidification line by controlling the first refrigerant flow control valve.

The first refrigerant flow control valve includes: a ball valve which has a refrigerant inlet for inflow of the refrigerant, a first outlet for sending the refrigerant toward the bypass line, and a second outlet for sending the refrigerant toward the outdoor heat exchanger; and an actuator which rotates the ball valve to adjust the refrigerant amount toward the bypass line depending on a rotation angle of the ball valve.

In a heat pump and dehumidification mode, the control unit increases the pressure of a refrigerant passage expanding via the first expansion valve to increase the refrigerant amount toward the evaporator through the dehumidification line.

As the outdoor air temperature rises, the control unit decreases the opening degree of the first refrigerant flow control valve toward the bypass line to increase the refrigerant amount introduced into the dehumidification line.

As the compressor RPM rises, the control unit decreases the opening degree of the first refrigerant flow control valve toward the bypass line to t increase the refrigerant amount introduced into the dehumidification line.

The vehicle heat pump system further includes: an electric heater disposed downstream of the indoor heat exchanger in an air flow direction of the air conditioning case, wherein in the heat pump and dehumidification mode, the control unit performs additional heating through the electric heater if temperature does not reach the set temperature due to the increase of the refrigerant amount toward the dehumidification line.

The vehicle heat pump system further includes: a temperature sensor which detects the temperature of the evaporator. If the temperature detected by the temperature sensor is higher than a target discharge temperature, the control unit controls the first refrigerant flow control valve in the direction of closing a bypass passage, and if the temperature detected by the temperature sensor remains higher than the target discharge temperature even when the first refrigerant flow control valve is fully closed, the control unit increases the compressor RPM.

The vehicle heat pump system further includes a second refrigerant flow control valve is provided in the dehumidification line to control the flow rate of the refrigerant flowing to the evaporator.

In the heat pump and dehumidification mode, the control unit fully opens the first refrigerant flow control valve and adjust the opening degree of the second refrigerant flow control valve.

A temperature sensor which detects the temperature of the evaporator is provided, wherein when the temperature detected by the temperature sensor is lower than a target discharge temperature, the control unit controls the opening degree of the second refrigerant flow control valve in a closing direction.

The control unit fully opens the second refrigerant flow control valve and controls the refrigerant amount flowing into the dehumidification line using the opening degree of the first refrigerant flow control valve.

The control unit controls the refrigerant amount flowing into the dehumidification line using the degrees of opening of the first and second refrigerant flow control valves.

The control unit controls the first refrigerant flow control valve targeting the evaporator temperature depending on the outdoor air temperature.

If the outdoor air temperature is higher than a first reference temperature, the control unit controls the first refrigerant flow control valve to perform a dehumidification improvement mode, and if the outdoor air temperature is lower than a second reference temperature, the control unit controls the first refrigerant flow control valve to release the dehumidification improvement mode, and the first reference temperature is higher than the second reference temperature.

In another aspect of the present invention, provided is a control method for a vehicle heat pump system, which includes: a compressor compressing and discharging refrigerant; an indoor heat exchanger installed within an air conditioning case and exchanging heat between air and the refrigerant discharged from the compressor to radiate heat; a first expansion valve selectively expanding the refrigerant that has passed through the indoor heat exchanger; an outdoor heat exchanger exchanging heat between the outdoor air and the refrigerant that has passed through the first expansion valve; an evaporator installed within the air conditioning case and evaporating the refrigerant that has passed through the outdoor heat exchanger by exchanging heat with the air; a bypass line which branches between the first expansion valve and the outdoor heat exchanger, and bypasses the outdoor heat exchanger and the evaporator; a first refrigerant flow control valve which adjusts the opening degree between the bypass line and a refrigerant line directing the outdoor heat exchanger; and a dehumidification line which branches between the first expansion valve and the first refrigerant flow control valve and supplies the refrigerant to the evaporator, the control method includes a step of controlling a refrigerant amount supplied to the dehumidification line depending on the outdoor air temperature or a compressor RPM.

In a heat pump and dehumidification mode, the pressure of a refrigerant passage expanded through the first expansion valve is increased to increase the refrigerant amount toward the evaporator through the dehumidification line.

As the outdoor air temperature rises, the opening degree toward the bypass line side of the first refrigerant flow control valve is decreased to increase the refrigerant amount flowing into the dehumidification line, and as the compressor RPM rises, the opening degree toward the bypass line side of the first refrigerant flow control valve is decreased to increase the refrigerant amount flowing into the dehumidification line.

Advantageous Effect

The vehicle heat pump system and the control method therefor according the to present invention, when dehumidification is performed in heat pump mode, can supply smoothly refrigerant of low-temperature and low-pressure toward the evaporator as much as required for dehumidification, thereby enhancing dehumidification performance, maintaining optimum air conditioning performance, preventing deterioration of heating performance, and preventing icing of the evaporator.

MODE FOR INVENTION

Hereinafter, a technical configuration of the vehicle heat pump system and a control method therefor will be described in detail below with reference to the attached drawings.

Figure 1:
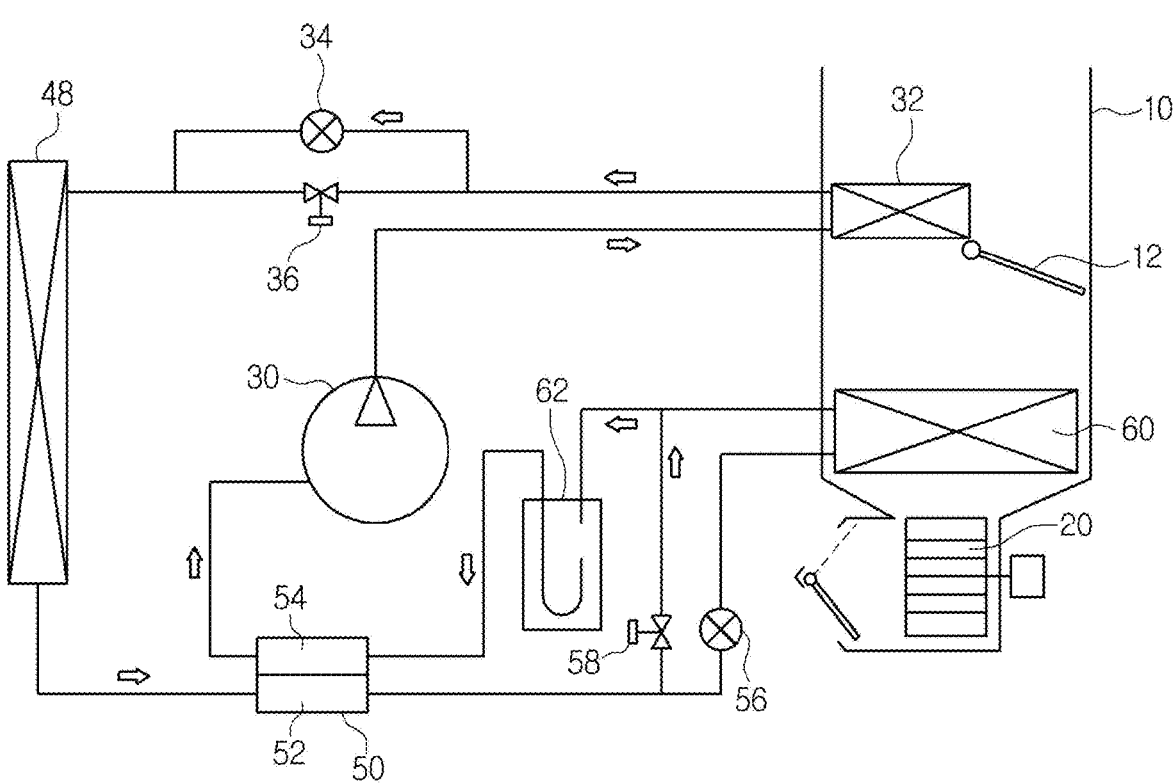
FIG. 1 illustrates a conventional vehicle heat pump system.
Figure 2:
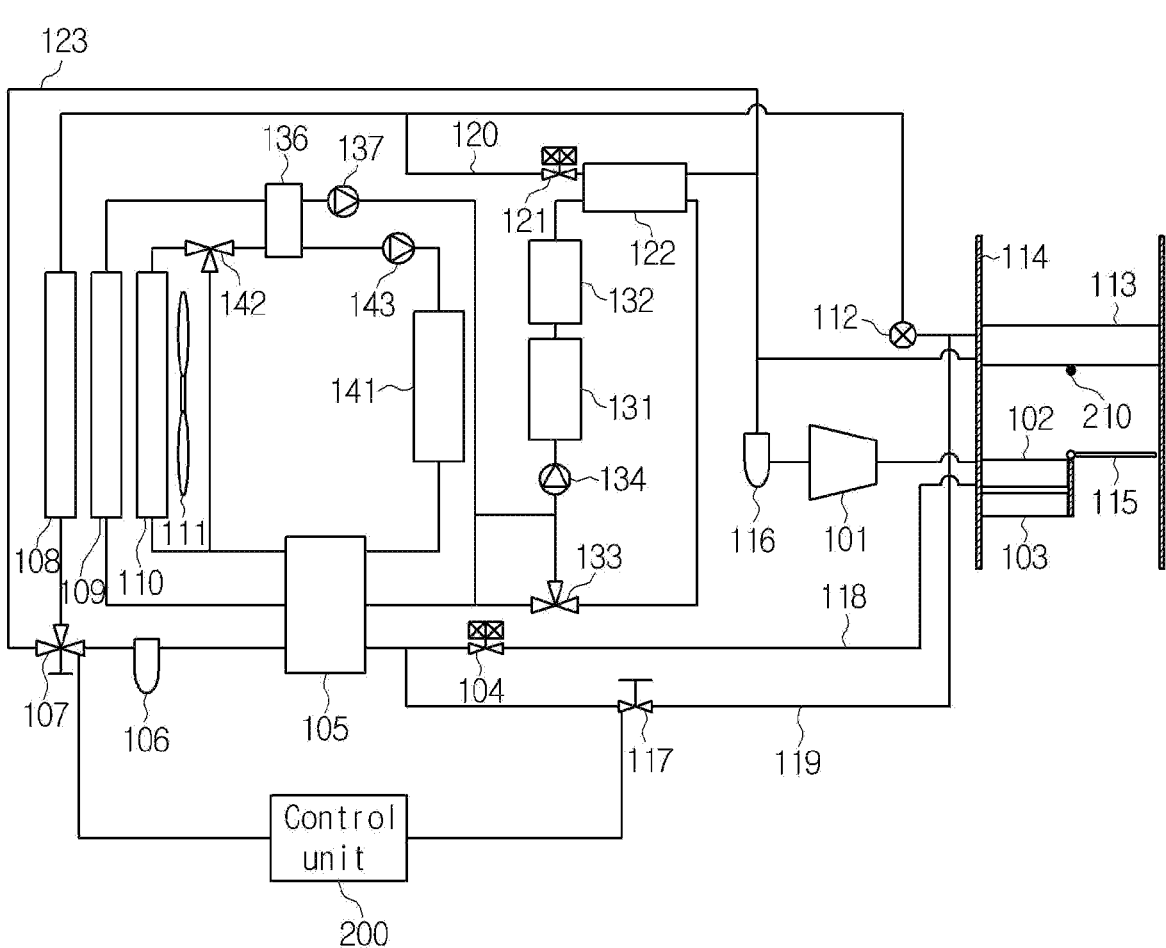
FIG. 2 illustrates a vehicle heat pump system according to an embodiment of the present invention.
Figure 3:
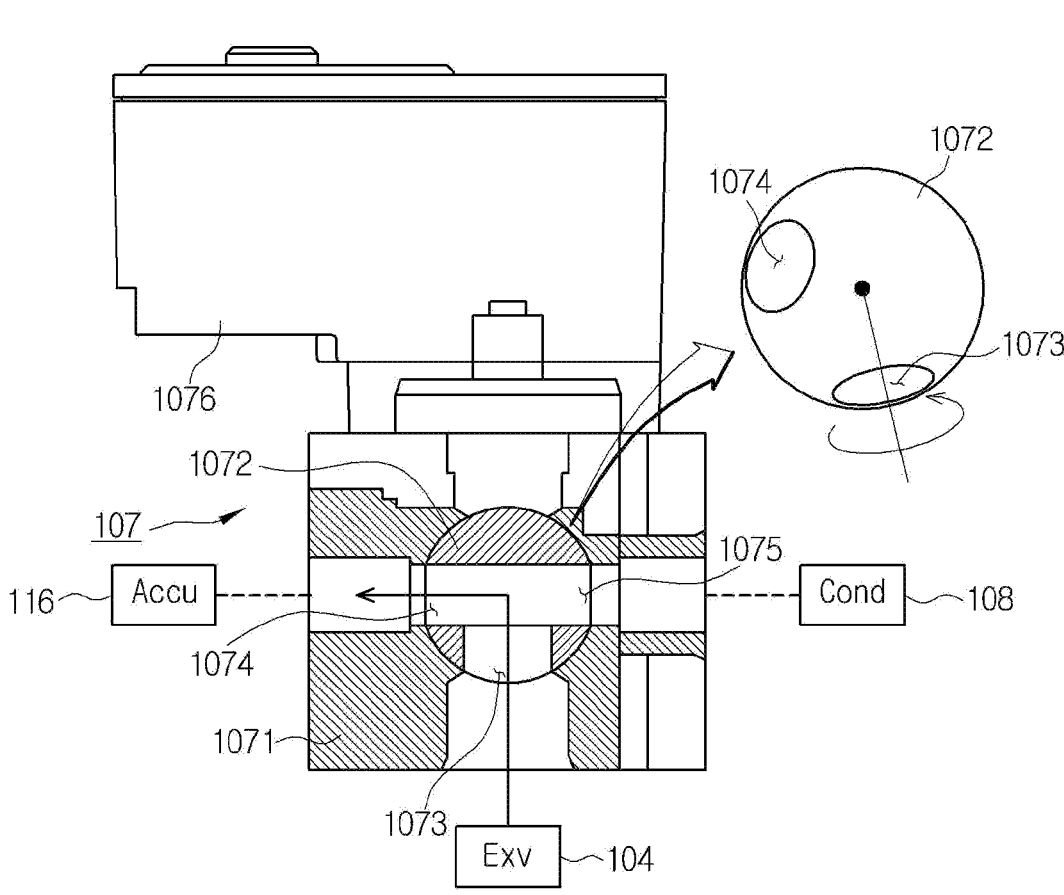
FIG. 3 is a sectional view illustrating the interior of a portion of a first refrigerant flow control valve, in cross section, according to an embodiment of the present invention.
Figure 4:
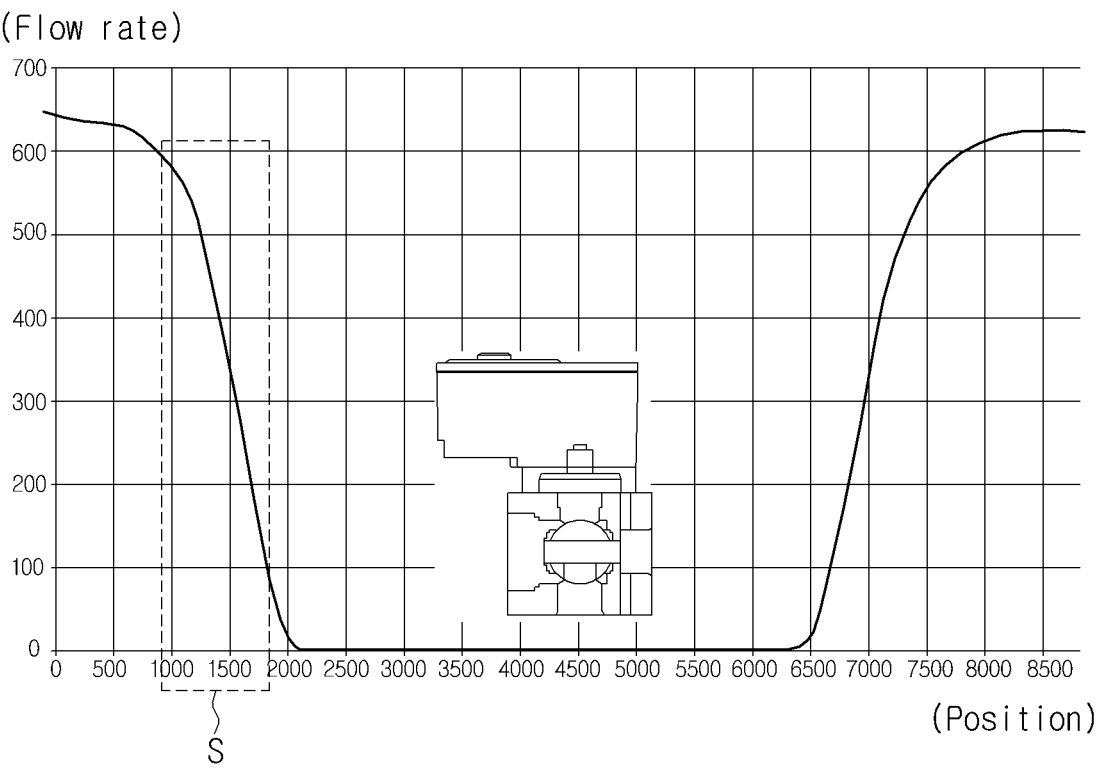
FIG. 4 is a graph indicating a refrigerant amount depending on the position of the first refrigerant flow control valve according to an embodiment of the present invention.

Referring to FIGS. 2 to 4, a vehicle heat pump system according to an embodiment of the present invention comprises a compressor 101, an indoor heat exchanger 102, a first expansion valve 104, an outdoor heat exchanger 108, a second expansion valve 112, and an evaporator 113, which are sequentially arranged in a refrigerant line 118 in a refrigerant flow direction.

The compressor 101 sucks and compresses refrigerant, and then, discharges the refrigerant in a high-temperature and high-pressure gaseous state. The indoor heat exchanger 102 is provided inside an air conditioning case 114, and heat-exchanges the refrigerant discharged from the compressor 101 with the air passing through the indoor heat exchanger 102 to radiate heat. The first expansion valve 104 selectively expands the refrigerant that has passed through the indoor heat exchanger 102. The outdoor heat exchanger 108 heat-exchanges the refrigerant that has passed through the first expansion valve 104 with the outdoor air passing through the outdoor heat exchanger.

The outdoor heat exchanger 108 and the second expansion valve 112 are sequentially disposed in a refrigerant line 118 between the first expansion valve 104 and the evaporator 113. The second expansion valve 112 expands the refrigerant passing through the outdoor heat exchanger 108. The evaporator 113 is provided inside the air conditioning case 114, and heat-exchanges the refrigerant with the air passing through the evaporator 113 to evaporate the refrigerant. Furthermore, the evaporator 113 and the indoor heat exchanger 102 are sequentially installed inside the air conditioning case 114 in the air flow direction.

An electric heater 103 such as a PTC is additionally provided downstream of the indoor heat exchanger 102 within the air conditioning case 114 in the air flow direction. Additionally, a temperature door 115 that controls an air flow rate between a warm air passage and a cold air passage to adjust the temperature of the air discharged to the interior of the vehicle is provided between the evaporator 113 and the indoor heat exchanger 102. An accumulator 116 is provided upstream of the compressor 101. That is, the accumulator 116 is provided between the evaporator 113 and the compressor 101 to separate the refrigerant entering the compressor 101 into a gas phase and a liquid phase.

The vehicle heat pump system includes a refrigerant line 118, a dehumidification line 119, a bypass line 123, and a battery cooling line 120. The refrigerant line 118 circulates the refrigerant through the compressor 101, the indoor heat exchanger 102, the first expansion valve 104, the outdoor heat exchanger 108, the second expansion valve 112, and the evaporator 113. The dehumidification line 119 branches off downstream of the first expansion valve 104 and supplies the refrigerant to the evaporator 113.

The bypass line 123 branches between the first expansion valve 104 and the outdoor heat exchanger 108, bypasses the outdoor heat exchanger 108 and the evaporator 113, and allows the refrigerant to flow directly to the accumulator 116. At the branching point of the bypass line 123, a first refrigerant flow control valve 107 is provided. A second refrigerant flow control valve 117 is provided in the dehumidification line 119 to control the flow of the refrigerant. The dehumidification line 119 branches between the first expansion valve 104 and the first refrigerant flow control valve 107 and supplies the refrigerant to the evaporator 113.

The first refrigerant flow control valve 107 adjusts the opening degree between the bypass line 123 and the refrigerant line directing the outdoor heat exchanger 108. That is, the first refrigerant flow control valve 107 is formed in a three-way valve to control the refrigerant to flow to the outdoor heat exchanger 108 or to bypass the outdoor heat exchanger 108 to flow toward the bypass line 123. In addition, the refrigerant flowing through the bypass line 123 passes through the accumulator 116 and returns and circulates to the compressor 101.

More specifically, a water-cooled condenser 105 and a receiver drier 106 are sequentially provided in the refrigerant line 118 downstream of the first expansion valve 104. The water-cooled condenser 105 heat-exchanges the refrigerant of the refrigerant line 118 with cooling water for electronic parts, which will be described later, or cooling water for a battery. In this case, the dehumidification line 119 branches between the first expansion valve 104 and the water-cooled condenser 105. Moreover, the first refrigerant flow control valve 107 branches between the receiver drier 106 and the outdoor heat exchanger 108.

The battery cooling line 120 branches from the refrigerant line between the outdoor heat exchanger 108 and the second expansion valve 112, bypasses the second expansion valve 112 and the evaporator 113, and then, is connected to the compressor 101. A third expansion valve 121 and a battery chiller 122 are sequentially disposed in the battery cooling line 120 in the refrigerant flow direction. The third expansion valve 121 is an electronic expansion valve (EXV) to selectively expand the refrigerant. Moreover, the battery chiller 122 heat-exchanges the refrigerant with cooling water of the battery.

Meanwhile, the vehicle heat pump system includes an electronic part cooling water line and a battery cooling water line. An electronic part 141 is connected to the electronic part cooling water line, and the cooling water that has passed through the electronic part 141 exchanges heat with the refrigerant in the water-cooled condenser 105. The electronic part cooling water line passes through the first radiator 110, a reserve tank 136, a water pump 143, the electronic part 141, and the water-cooled condenser 105. A cooling water control valve 142 is provided in the electronic part cooling water line, so that the cooling water selectively passes through or bypasses the first radiator 110.

A battery 131 is connected to the battery cooling water line, and the cooling water that has passed through the battery 131 exchanges heat with the refrigerant in the water-cooled condenser 105 or exchanges heat with the refrigerant in the battery chiller 122. Additionally, the battery cooling water line passes through the second radiator 109, the reserve tank 136, a water pump 137, and the water-cooled condenser 105. Furthermore, the battery cooling water line passes through the battery 131, a water heater 132, a battery chiller 122, and a water pump 134.

Meanwhile, the battery cooling water line is equipped with a cooling water control valve 133 for controlling a cooling water flow. The outdoor heat exchanger 108, the second radiator 109, and the first radiator 110 heat-exchange the refrigerant or the cooling water with the outdoor air. The second radiator 109 is a low-temperature radiator on the battery side, and the first radiator 110 is a high-temperature radiator on the electronic part side. A blower fan 111 may be provided on one side of the outdoor heat exchanger 108, the second radiator 109, and the first radiator 110.

The vehicle heat pump system includes a control unit 200. The control unit 200 controls the amount of the refrigerant supplied to the dehumidification line 119 according to the outdoor air temperature or compressor RPM. More specifically, the first refrigerant flow control valve 107 is a three-way valve, and is configured to adjust the refrigerant amount toward the bypass line 123 and the refrigerant amount toward the outdoor heat exchanger 108.

In this case, the control unit 200 controls the first refrigerant flow control valve 107 to adjust the amount of refrigerant supplied to the dehumidification line 119. That is, in the heat pump and dehumidification mode, when the control unit 200 controls the first refrigerant flow control valve 107 to reduce the refrigerant amount toward the bypass line 123, relatively more refrigerant flows towards the dehumidification line 119 so that the refrigerant amount toward the evaporator 113 can be increased.

Contrary, in the heat pump and dehumidification mode, when the control unit 200 controls the first refrigerant flow control valve 107 to increase the refrigerant amount toward the bypass line 123, relatively less refrigerant flows toward the dehumidification line 119 so that the refrigerant amount toward the evaporator 113 can be reduced.

The first refrigerant flow control valve 107 includes a valve body 1071, a ball valve 1072, and an actuator 1076. The ball valve 1072 is formed in a spherical shape. At one side of the ball valve, a refrigerant inlet 1073 for bringing in the refrigerant is formed, and at the other side of the ball valve, a first outlet 1074 for sending the refrigerant toward the bypass line 123 and a second outlet 1075 for sending the refrigerant toward the outdoor heat exchanger 108 are formed. The actuator 1076 is connected to the ball valve 1072 to rotate the ball valve 1072 around a rotary axis.

That is, the ball valve 1072 is rotatably mounted on the valve body 1071, and is rotated around the rotary axis by the actuator 1076. Moreover, the control unit 200 controls the operation of the actuator 1076 to adjust the refrigerant amount toward the bypass line 123 according to a rotation angle of the ball valve 1072. The refrigerant introduced into the refrigerant inlet 1073 of the ball valve 1072 flows to the accumulator 116 via the bypass line 123 or flows to the outdoor heat exchanger 108.

Depending on the rotation of the ball valve 1072, when the first outlet 1074 is connected to the refrigerant line connected to the accumulator 116, the refrigerant introduced into the refrigerant inlet 1073 flows to the accumulator 116 through the first outlet 1074. Furthermore, depending on the rotation of the ball valve 1072, when the second outlet 1075 is connected to the refrigerant line connected to the outdoor heat exchanger 108, the refrigerant introduced into the refrigerant inlet 1073 flows to the outdoor heat exchanger 108 through the second outlet 1075.

In this case, when the rotation angle of the ball valve 1072 is controlled, a connection area between the refrigerant line connected to the accumulator 116 and the first outlet 1074 is adjusted, thereby controlling the refrigerant amount. That is, as illustrated in FIG. 4, when the rotation angle of the ball valve 1072 of the first refrigerant flow control valve 107 within a using area (S), it is possible to increase or decrease the refrigerant amount toward the accumulator 116 through the bypass line 123.

When the control unit 200 controls the rotation angle of the ball valve 1072 to reduce the opening degree of the refrigerant line toward the accumulator 116, the system resistance toward the accumulator 116 increases and the refrigerant amount decreases. Accordingly, the refrigerant that expanded at low temperature and low pressure while passing through the first expansion valve 104 relatively increases pressure of the refrigerant passage through the dehumidification line 119 to increase the flow rate of the refrigerant introduced into the evaporator 113, thereby enhancing dehumidification performance. As described above, in the heat pump and dehumidification mode, the control unit 200 increases the pressure of the refrigerant passage expanded through the first expansion valve 104 to increase the refrigerant amount to the evaporator 113 through the dehumidification line 119.

In this case, as the outdoor air temperature rises, the control unit 200 decreases the opening degree toward the bypass line 123 of the first refrigerant flow control valve 107 to increase the flow rate of the refrigerant introduced into the dehumidification line 119. Moreover, as RPM of the compressor 101 increases, the control unit 200 decreases the opening degree toward the bypass line 123 of the first refrigerant flow control valve 107 to increase the flow rate of the refrigerant introduced into the dehumidification line 119.

Meanwhile, the vehicle heat pump system includes a temperature sensor 210 which detects the temperature of the evaporator 113. The control unit 200 can adjust the refrigerant amount of the first refrigerant flow control valve 107 by setting a target discharge temperature (DTT) using the temperature sensor 210. That is, if the temperature detected by the temperature sensor 210 is higher than the target discharge temperature (DTT), the control unit 200 controls the first refrigerant flow control valve 107 in the direction of closing the passage of the bypass line 123. When the first refrigerant flow control valve 107 is controlled in the closing direction, the refrigerant amount toward the evaporator 113 through the dehumidification line 119 increases.

Furthermore, if the temperature detected by the temperature sensor 210 is higher than the target discharge temperature (DTT) even when the first refrigerant flow control valve 107 completely closes the passage toward the bypass line 123, the control unit 200 increases the compressor RPM. Meanwhile, in the heat pump and dehumidification mode, if temperature does not reach the set temperature due to the increase of the refrigerant amount toward the dehumidification line 119, the control unit 200 controls to perform additional heating through the electric heater 103.

In summary, the control unit controls differently the opening degree of the first refrigerant flow control valve 107 based on the outdoor air temperature and the compressor RPM. That is, as the outdoor air temperature rises, the control unit controls the opening degree of the first refrigerant flow control valve 107 of the side of the bypass line 123 to be reduced, and as the compressor RPM rises, the control unit controls the opening degree of the first refrigerant flow control valve 107 of the side of the bypass line 123 to be reduced.

Through such a configuration, when dehumidification is carried out in the heat pump mode (that is, the heat pump and dehumidification mode), enough low-temperature and low-pressure refrigerant for dehumidification is supplied to the evaporator 113, thereby enhancing dehumidification performance and maintaining optimal air conditioning performance.

Meanwhile, a second refrigerant flow control valve 117 is additionally provided on the dehumidification line 119 to control the flow of the refrigerant flowing to the evaporator 113. When the temperature detected by the temperature sensor 210 is lower than the target discharge temperature (DTT), the control unit 200 controls the opening degree of the second refrigerant flow control valve 117 in the closing direction. That is, in the heat pump and dehumidification mode, the control unit 200 fully opens the first refrigerant flow control valve 107 and adjusts the opening degree of the second refrigerant flow control valve 117.

As described above, when the second refrigerant flow control valve 117 is formed in the form of a flow control valve, it is possible to control so that excessive refrigerant does not flow to the evaporator 113 through the dehumidification line 119. Therefore, the heat pump system can prevent deterioration in heating performance and effectively prevent icing of the evaporator 113.

Meanwhile, as a modification of the present invention, the control unit 200 can fully open the second refrigerant flow control valve 117 in the heat pump and dehumidification mode, and can control the flow rate of the refrigerant introduced into the dehumidification line 119 using the opening degree of the first refrigerant flow control valve 107.

Moreover, in another modification of the present invention, the control unit 200 can control the flow rate of the refrigerant introduced into the dehumidification line 119 using the degrees of opening of the first refrigerant flow control valve 107 and the second refrigerant flow control valve 117 in the heat pump and dehumidification mode.

Figure 8:
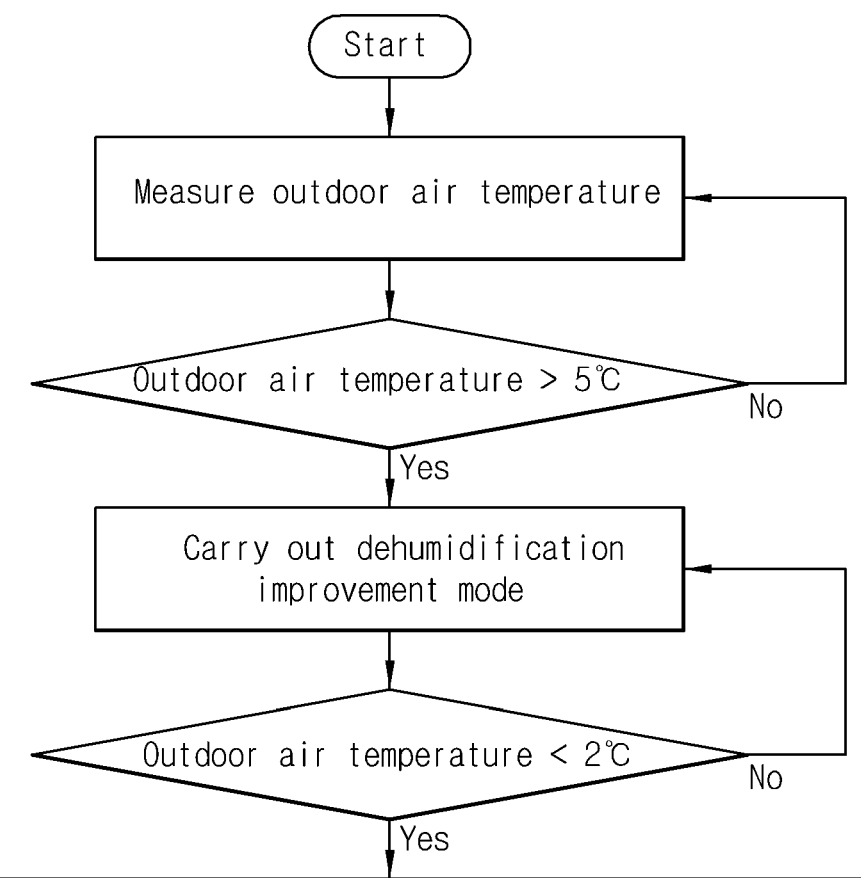
FIG. 8 is a flowchart illustrating a portion of a control method for the vehicle heat pump system according to a modification of the present invention.

Furthermore, in yet another modification of the present invention, the control unit 200 can control the first refrigerant flow control valve 107 targeting the temperature of the evaporator 113 depending on the outdoor air temperature. Referring to FIG. 8, when the outdoor air temperature is higher than a first reference temperature, the control unit 200 performs a dehumidification improvement mode by controlling the first refrigerant flow control valve 107. When the outdoor air temperature is lower than a second reference temperature, the control unit 200 releases the dehumidification improvement mode by controlling the first refrigerant flow control valve 107. In this case, the first reference temperature is set to be higher than the second reference temperature.

For example, the first reference temperature is 5° C., and the second reference temperature is 2° C. According to the embodiment of FIG. 8, logic is provided to improve dehumidification performance under harsh dehumidification conditions in the heat pump and dehumidification mode. In this case, the harsh dehumidification condition means a condition where the air temperature flowing into the evaporator 113 increases and the refrigerant amount distributed to the evaporator 113 decreases.

That is, when the outdoor air temperature is measured, in a case in which the outdoor air temperature is higher than 5° C., and in a case in which the current mode is the heat pump and dehumidification mode, the control unit 200 determines the current condition as the harsh dehumidification condition and performs the dehumidification improvement mode. That is, the control unit 200 controls the first refrigerant flow control valve 107 based on the target temperature of the evaporator. For example, the control unit 200 can refer to an evaporator target temperature matching by list outdoor temperature when controlling the first refrigerant flow control valve 107.

In addition, in a case in which the outdoor air temperature is lower than 2° C., the control unit 200 controls the first refrigerant flow control valve 107 to release the dehumidification improvement mode and performs the control with the default value of the heat pump and dehumidification mode.

Meanwhile, a control method of a vehicle heat pump system according to an embodiment of the present invention will be described. The control unit 200 controls the refrigerant amount supplied to the dehumidification line based on the outdoor air temperature or compressor RPM. That is, in the heat pump and dehumidification mode, the control unit 200 increases the pressure of the refrigerant passage expanded through the first expansion valve 104 to increase the refrigerant amount toward the evaporator 113 through the dehumidification line 119.

More specifically, as the outdoor air temperature increases, the control unit 200 reduces the opening degree of the first refrigerant flow control valve 107 toward the bypass line 123 to increase the refrigerant amount introduced into the dehumidification line 119. Furthermore, as the compressor RPM increases, the control unit 200 reduces the opening degree toward the bypass line 123 of the first refrigerant flow control valve 107 to increase the refrigerant amount introduced into the dehumidification line 119.

Figure 5:
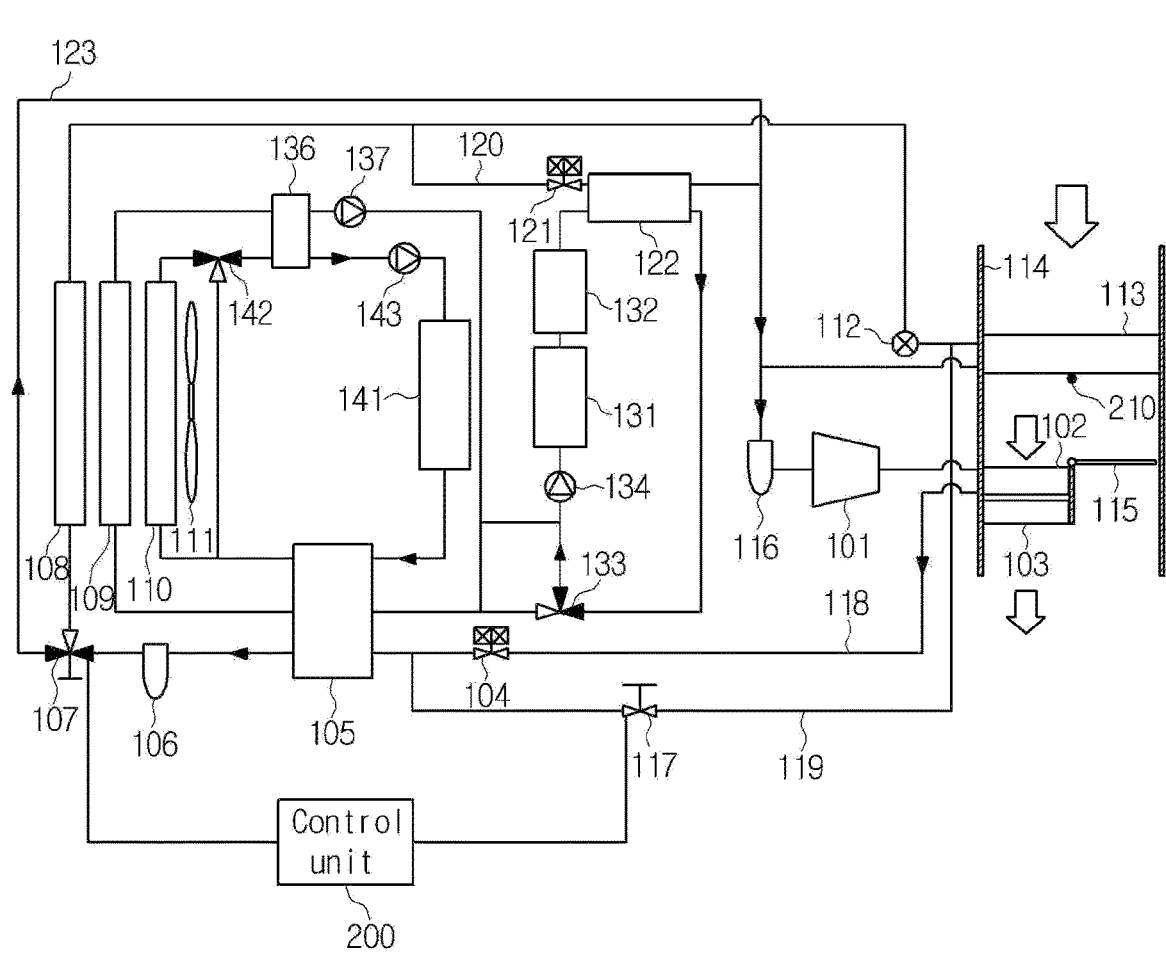
FIG. 5 illustrates a heat pump mode of the vehicle heat pump system according to an embodiment of the present invention.

Referencing to FIG. 5, in the heat pump mode (heating mode), the refrigerant discharged from the compressor 101 flows through the indoor heat exchanger 102, and exchanges heat with the air passing through the indoor heat exchanger 102. The temperature door 115 opens the warm air passage, and the air is heated by the indoor heat exchanger 102 and is discharged into the interior of the vehicle. The refrigerant that has passed through the indoor heat exchanger 102 is throttled and expanded by the first expansion valve 104.

The refrigerant passing through the first expansion valve 104 flows to the bypass line 123 through the first refrigerant flow control valve 107, passes through the accumulator 116, and returns to the compressor 101 to circulate. In this case, the second expansion valve 112 is closed, the third expansion valve 121 is opened, and the second refrigerant flow control valve 117 is closed. Meanwhile, the refrigerant passing the e first expansion valve 104 exchanges heat with cooling water in the water-cooled condenser 105 to recover waste heat, and the refrigerant does not circulate through the second expansion valve 112 and the evaporator 113.

Figure 6:
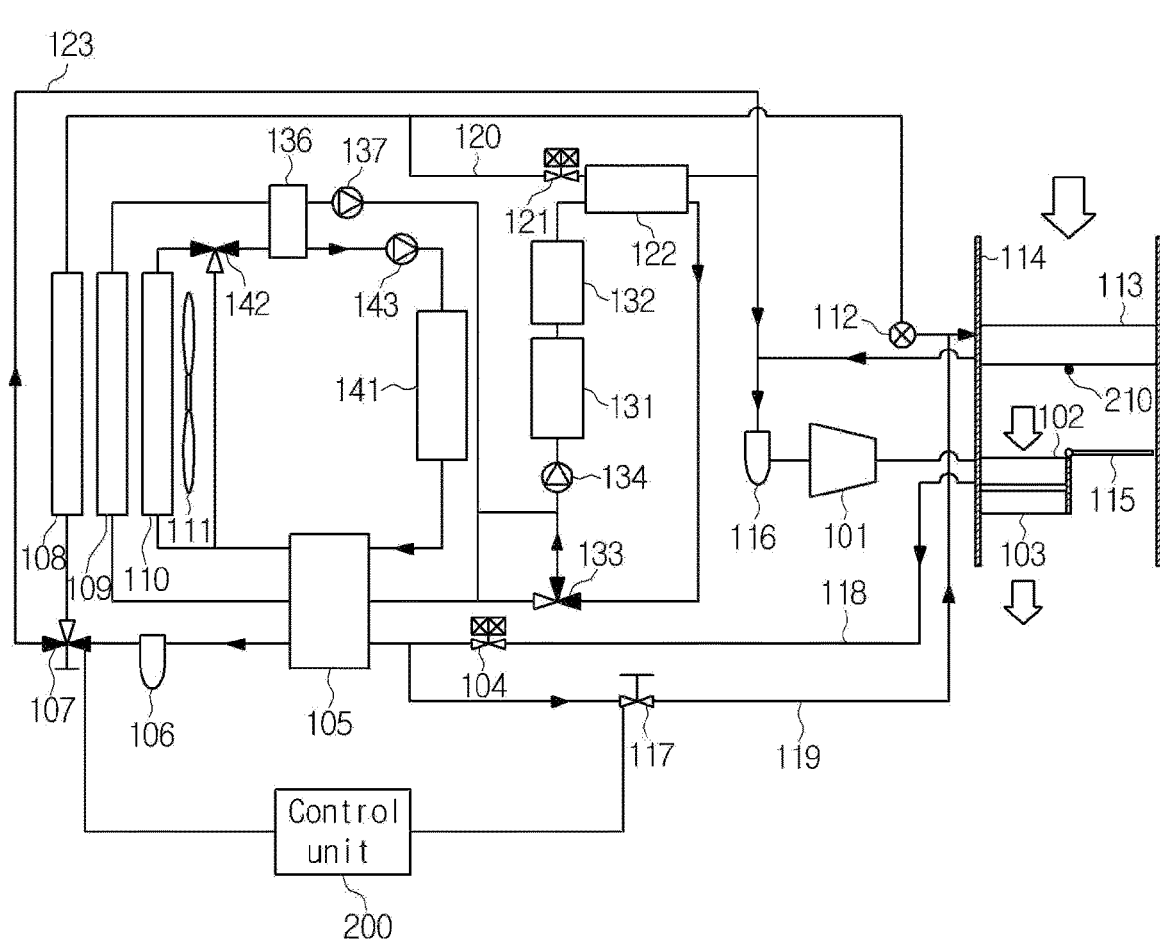
FIG. 6 depicts a heat pump and dehumidification mode of the vehicle heat pump system according to an embodiment of the present invention.

Referencing to FIG. 6, in the heat pump and dehumidification mode (heating mode+dehumidification mode), the refrigerant discharged from the compressor 101 flows through the indoor heat exchanger 102, and exchanges heat with the air passing through the indoor heat exchanger 102. The temperature door 115 opens the warm air passage, and the air is heated by the indoor heat exchanger 102 and discharged to the interior of the vehicle. The refrigerant that has passed through the indoor heat exchanger 102 is throttled and expanded by the first expansion valve 104.

A portion of the refrigerant passing through the first expansion valve 104 flows to the bypass line 123 through the first refrigerant flow control valve 107, passes through the accumulator 116, and then, returns to the compressor 101 to circulate. In this case, the second expansion valve 112 is closed, the third expansion valve 121 is opened, and the second refrigerant flow control valve 117 is opened. In addition, the refrigerant passing the first expansion valve 104 exchanges heat with cooling water in the water-cooled condenser 105 to recover waste heat, and the refrigerant does not circulate through the second expansion valve 112 and the evaporator 113.

Meanwhile, another portion of the refrigerant passing through the first expansion valve 104 flows to the dehumidification line 119 due to the opening of the second refrigerant flow control valve 117 and passes through the evaporator 113. The refrigerant flowing through the evaporator 113 exchanges heat with the air passing through the evaporator 113, and dehumidifies the air discharged into the vehicle interior. In this case, the first refrigerant flow control valve 107 controls the refrigerant amount of the bypass line 123 by the control unit 200 to increase the refrigerant amount flowing to the dehumidification line 119.

Figure 7:
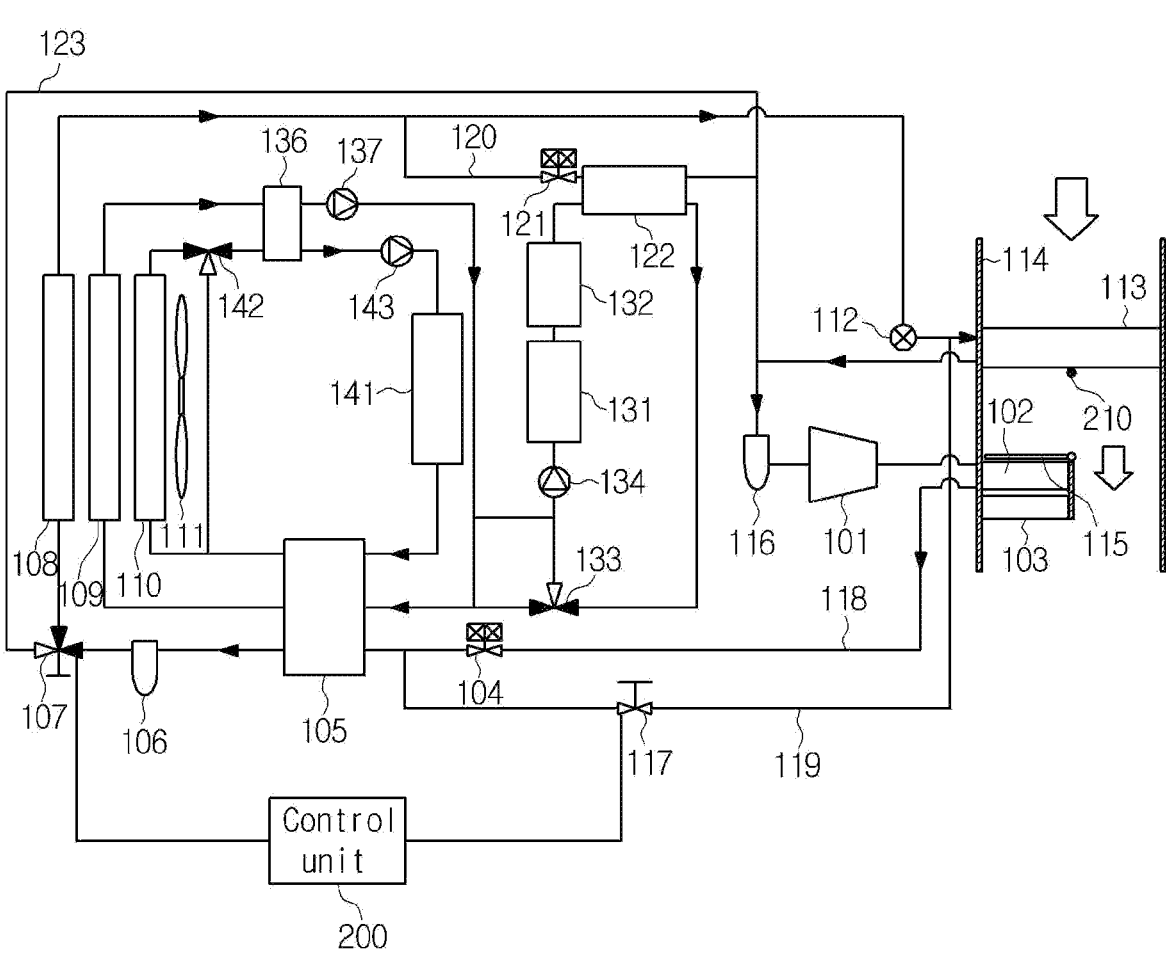
FIG. 7 illustrates an air conditioning mode of the vehicle heat pump system according to an embodiment of the present invention.

Referring to FIG. 7, in the air conditioning mode (cooling mode), the refrigerant discharged from the compressor 101 does not exchange heat with the air and directly passes through the indoor heat exchanger 102 flowing toward the first expansion valve 104. The temperature door 115 closes the warm air passage, and the cooled air passing through the evaporator 113 bypasses the indoor heat exchanger 102, and is discharged to the interior of the vehicle through the cold air passage.

The first expansion valve 104 is opened to pass the refrigerant as it is without expansion. The refrigerant passing through the first expansion valve 104 flows to the outdoor heat exchanger 108 by the first refrigerant flow control valve 107, heat exchange with the outdoor air, and then is throttled and expanded in the second expansion valve 112, and is evaporated by heat-exchange with the air passing through the evaporator 113, and then returns to the compressor 101 to circulate. In this case, the third expansion valve 121 is closed, and the second refrigerant flow control valve 117 is also closed. The control unit immediately closes the second refrigerant flow control valve 117 without delay to prevent refrigerant noise caused by the movement of the first expansion valve 104.

What is claimed is:

1. A vehicle heat pump system, which includes: a compressor compressing and discharging refrigerant; an indoor heat exchanger installed within an air conditioning case and exchanging heat between indoor air and the refrigerant discharged from the compressor to radiate heat; a first expansion valve selectively expanding the refrigerant that has passed through the indoor heat exchanger; an outdoor heat exchanger exchanging heat between outdoor air and the refrigerant that has passed through the first expansion valve; and an evaporator installed within the air conditioning case and evaporating the refrigerant that has passed through the outdoor heat exchanger by exchanging heat with the outdoor air, the system comprising:

a bypass line which branches between the first expansion valve and the outdoor heat exchanger, and bypasses the outdoor heat exchanger and the evaporator;

a first refrigerant flow control valve which adjusts an opening degree between the bypass line and a refrigerant line directing the outdoor heat exchanger;

a dehumidification line which branches between the first expansion valve and the first refrigerant flow control valve and supplies the refrigerant to the evaporator; and a control unit which controls a refrigerant amount supplied to the dehumidification line depending on a temperature of the outdoor air or a compressor RPM, wherein in a heat pump and dehumidification mode, the control unit increases pressure of a refrigerant passage expanding via the first expansion valve to increase the refrigerant amount toward the evaporator through the dehumidification line.

2. The vehicle heat pump system according to claim 1, wherein the first refrigerant flow control valve is a three-way valve capable of adjusting the refrigerant amount toward the bypass line and the outdoor heat exchanger, and wherein the control unit controls the refrigerant amount supplied to the dehumidification line by controlling the first refrigerant flow control valve.

3. The vehicle heat pump system according to claim 2, wherein the first refrigerant flow control valve comprises:

a ball valve which has a refrigerant inlet for inflow of the refrigerant, a first outlet for sending the refrigerant toward the bypass line, and a second outlet for sending the refrigerant toward the outdoor heat exchanger; and an actuator which rotates the ball valve to adjust the refrigerant amount toward the bypass line depending on a rotation angle of the ball valve.

4. A vehicle heat pump system, which includes: a compressor compressing and discharging refrigerant; an indoor heat exchanger installed within an air conditioning case and exchanging heat between indoor air and the refrigerant discharged from the compressor to radiate heat; a first expansion valve selectively expanding the refrigerant that has passed through the indoor heat exchanger; an outdoor heat exchanger exchanging heat between outdoor air and the refrigerant that has passed through the first expansion valve; and an evaporator installed within the air conditioning case and evaporating the refrigerant that has passed through the outdoor heat exchanger by exchanging heat with the outdoor air, the system comprising:

a bypass line which branches between the first expansion valve and the outdoor heat exchanger, and bypasses the outdoor heat exchanger and the evaporator;

a first refrigerant flow control valve which adjusts an opening degree between the bypass line and a refrigerant line directing the outdoor heat exchanger;

a dehumidification line which branches between the first expansion valve and the first refrigerant flow control valve and supplies the refrigerant to the evaporator; and a control unit which controls a refrigerant amount supplied to the dehumidification line depending on a temperature of the outdoor air or a compressor RPM, wherein as the outdoor air temperature rises, the control unit decreases the opening degree of the first refrigerant flow control valve toward the bypass line to increase the refrigerant amount introduced into the dehumidification line.

5. The vehicle heat pump system according to claim 1, wherein as the compressor RPM rises, the control unit decreases the opening degree of the first refrigerant flow control valve toward the bypass line to increase the refrigerant amount introduced into the dehumidification line.

6. The vehicle heat pump system according to claim 1, further comprising:

an electric heater disposed downstream of the indoor heat exchanger in an air flow direction of the air conditioning case, wherein in a heat pump and dehumidification mode, the control unit performs additional heating through the electric heater if temperature does not reach a set temperature due to the increase of the refrigerant amount toward the dehumidification line.

7. A vehicle heat pump system, which includes: a compressor compressing and discharging refrigerant; an indoor heat exchanger installed within an air conditioning case and exchanging heat between indoor air and the refrigerant discharged from the compressor to radiate heat; a first expansion valve selectively expanding the refrigerant that has passed through the indoor heat exchanger; an outdoor heat exchanger exchanging heat between outdoor air and the refrigerant that has passed through the first expansion valve; and an evaporator installed within the air conditioning case and evaporating the refrigerant that has passed through the outdoor heat exchanger by exchanging heat with the outdoor air, the system comprising:

a bypass line which branches between the first expansion valve and the outdoor heat exchanger, and bypasses the outdoor heat exchanger and the evaporator;

a first refrigerant flow control valve which adjusts an opening degree between the bypass line and a refrigerant line directing the outdoor heat exchanger;

a dehumidification line which branches between the first expansion valve and the first refrigerant flow control valve and supplies the refrigerant to the evaporator;

a control unit which controls a refrigerant amount supplied to the dehumidification line depending on a temperature of the outdoor air or a compressor RPM; and a temperature sensor which detects the temperature of the evaporator, wherein if the temperature detected by the temperature sensor is higher than a target discharge temperature, the control unit controls the first refrigerant flow control valve in the direction of closing the bypass line, and wherein if the temperature detected by the temperature sensor remains higher than the target discharge temperature even when the first refrigerant flow control valve is fully closed, the control unit increases the compressor RPM.

8. The vehicle heat pump system according to claim 1, further comprising:

a second refrigerant flow control valve is provided in the dehumidification line to control the flow rate of the refrigerant flowing to the evaporator.

9. The vehicle heat pump system according to claim 8, wherein in a heat pump and dehumidification mode, the control unit fully opens the first refrigerant flow control valve and adjust the opening degree of the second refrigerant flow control valve.

10. The vehicle heat pump system according to claim 9, wherein a temperature sensor which detects the temperature of the evaporator is provided, and wherein when the temperature detected by the temperature sensor is lower than a target discharge temperature, the control unit controls the opening degree of the second refrigerant flow control valve in a closing direction.

11. A vehicle heat pump system, which includes: a compressor compressing and discharging refrigerant; an indoor heat exchanger installed within an air conditioning case and exchanging heat between indoor air and the refrigerant discharged from the compressor to radiate heat; a first expansion valve selectively expanding the refrigerant that has passed through the indoor heat exchanger; an outdoor heat exchanger exchanging heat between outdoor air and the refrigerant that has passed through the first expansion valve; and an evaporator installed within the air conditioning case and evaporating the refrigerant that has passed through the outdoor heat exchanger by exchanging heat with the outdoor air, the system comprising:

a bypass line which branches between the first expansion valve and the outdoor heat exchanger, and bypasses the outdoor heat exchanger and the evaporator;

a first refrigerant flow control valve which adjusts an opening degree between the bypass line and a refrigerant line directing the outdoor heat exchanger;

a dehumidification line which branches between the first expansion valve and the first refrigerant flow control valve and supplies the refrigerant to the evaporator; and a control unit which controls a refrigerant amount supplied to the dehumidification line depending on a temperature of the outdoor air or a compressor RPM; and a second refrigerant flow control valve provided in the dehumidification line to control the flow rate of the refrigerant flowing to the evaporator, wherein the control unit fully opens the second refrigerant flow control valve and controls the refrigerant amount flowing into the dehumidification line using the opening degree of the first refrigerant flow control valve.

12. The vehicle heat pump system according to claim 8, wherein the control unit controls the refrigerant amount flowing into the dehumidification line using the degrees of opening of the first and second refrigerant flow control valves.

13. The vehicle heat pump system according to claim 4, wherein the control unit controls the first refrigerant flow control valve targeting a temperature of the evaporator depending on the outdoor air temperature.

14. The vehicle heat pump system according to claim 4, wherein if the outdoor air temperature is higher than a first reference temperature, the control unit controls the first refrigerant flow control valve to perform a dehumidification improvement mode, and if the outdoor air temperature is lower than a second reference temperature, the control unit controls the first refrigerant flow control valve to release the dehumidification improvement mode, and the first reference temperature is higher than the second reference temperature.

15. A control method for a vehicle heat pump system, which includes: a compressor compressing and discharging refrigerant; an indoor heat exchanger installed within an air conditioning case and exchanging heat between indoor air and the refrigerant discharged from the compressor to radiate heat; a first expansion valve selectively expanding the refrigerant that has passed through the indoor heat exchanger; an outdoor heat exchanger exchanging heat between outdoor air and the refrigerant that has passed through the first expansion valve; an evaporator installed within the air conditioning case and evaporating the refrigerant that has passed through the outdoor heat exchanger by exchanging heat with the outdoor air; a bypass line which branches between the first expansion valve and the outdoor heat exchanger, and bypasses the outdoor heat exchanger and the evaporator; a first refrigerant flow control valve which adjusts an opening degree between the bypass line and a refrigerant line directing the outdoor heat exchanger; and a dehumidification line which branches between the first expansion valve and the first refrigerant flow control valve and supplies the refrigerant to the evaporator, the control method comprising:

a step of controlling a refrigerant amount supplied to the dehumidification line depending on a temperature of the outdoor air or a compressor RPM, wherein in a heat pump and dehumidification mode, the pressure of a refrigerant passage expanded through the first expansion valve is increased to increase the refrigerant amount toward the evaporator through the dehumidification line.

16. The control method according to claim 15, wherein as the outdoor air temperature rises, the opening degree toward the bypass line side of the first refrigerant flow control valve is decreased to increase the refrigerant amount flowing into the dehumidification line, and as the compressor RPM rises, the opening degree toward the bypass line side of the first refrigerant flow control valve is decreased to increase the refrigerant amount flowing into the dehumidification line.

* * * * *